Figure 1:
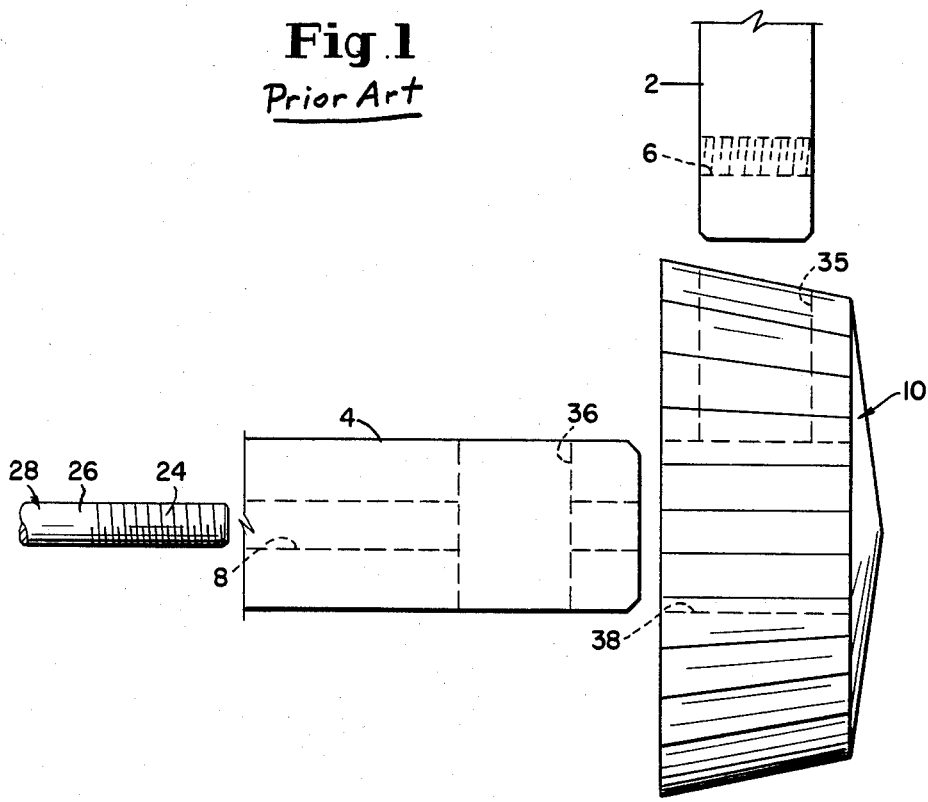

United States Patent [19]

Patroni

[11] Patent Number: 4,641,992
[45] Date of Patent: Feb. 10, 1987

[54] ROD JOINT

[75] Inventor: Anthony F. Patroni, Margate, N.J.

[73] Assignee: Boardwalk Regency Corporation, Atlantic City, N.J. ; a part interest

[21] Appl. No.: 846,855

[22] Filed: Apr. 1, 1986

[51] Int. Cl.⁴ .............................................. B25G 3/08
[52] U.S. Cl. .................................... 403/382; 403/347; 403/400; 403/260; 74/523
[58] Field of Search ............... 403/260, 344, 347, 382, 403/259, 261, 345, 400; 74/523, 543, 548

[56] References Cited

U.S. PATENT DOCUMENTS 3,382,733  5/1968  Miller et al. ........................... 74/543
3,383,944  5/1968  Skinner ................................. 74/543
3,868,193  2/1975  Schott .................................. 403/344

Primary Examiner—Andrew V. Kundrat
Attorney, Agent, or Firm—Nies, Webner, Kurz & Bergert

[57] ABSTRACT

A joint connects an arm to a shaft. A split collar which clamps onto the shaft has a radial passage which registers with the transverse passage through the shaft and an end of the arm engages through the two passages. The split collar is clamped tightly onto the shaft and against the arm externally of the shaft.

2 Claims, 4 Drawing Figures

ROD JOINT

OBJECTS

This invention relates to a structure for joining an arm to a shaft. It is an improvement in the slot machine art wherein the rod is a handle and the shaft supports a rack. The arm is pulled, sometimes with considerable force, to rock the shaft about its axis, and considerable difficulty has been encountered in that the arm breaks at the joint and must be replaced. Hitherto, the arm, near its end, had a transverse threaded bore and the bore-end of the arm was engaged through a tranverse bore in the shaft. The shaft had a longitudinal bore through which engaged the threaded end of an assembly bolt, which threaded end engaged through the threads in the transverse bore of the arm. The transverse threaded bore through the arm weakened the arm to such an extent that invariably, when the arm broke off, it did so at the transverse bore. The joint was encased in a hub, but the hub was for cosmetic purposes only and it was ineffectual to prevent breaking-off of the arm. As the arm was pulled it would rock back and forth in the transverse bore through the shaft and eventually break off.

The object of this invention is to provide a joint which is easily adaptable to the existing shaft and arm usually found in slot machines with only slight modifications of those parts, and which joint can be easily assembled and disassembled; and if breakage at the joint does occur, the parts can be easily disassembled and the broken pieces driven out and replaced, with very little down time on the machine.

Figure 2:
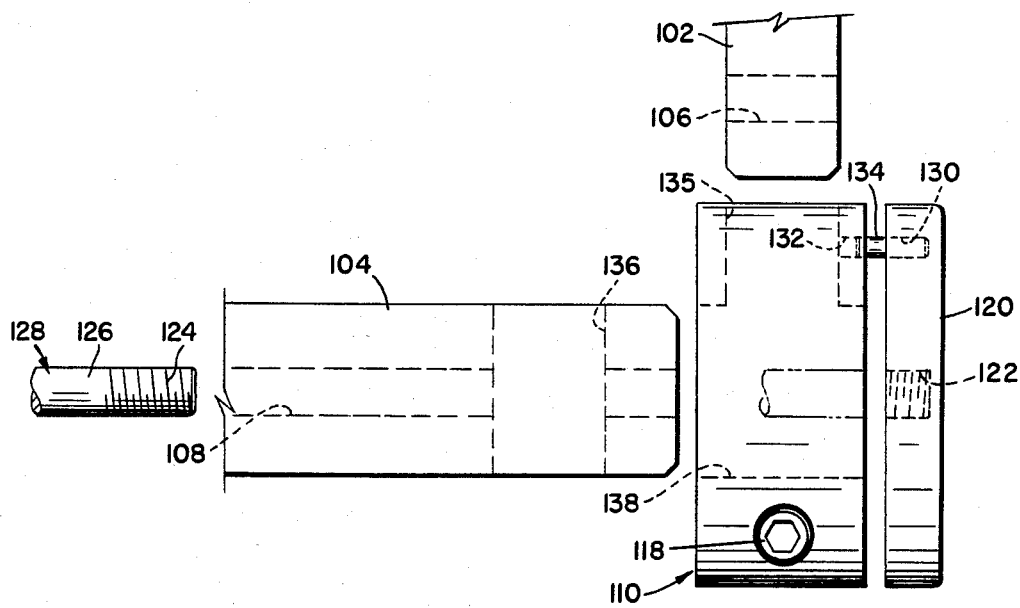
Figure 3:
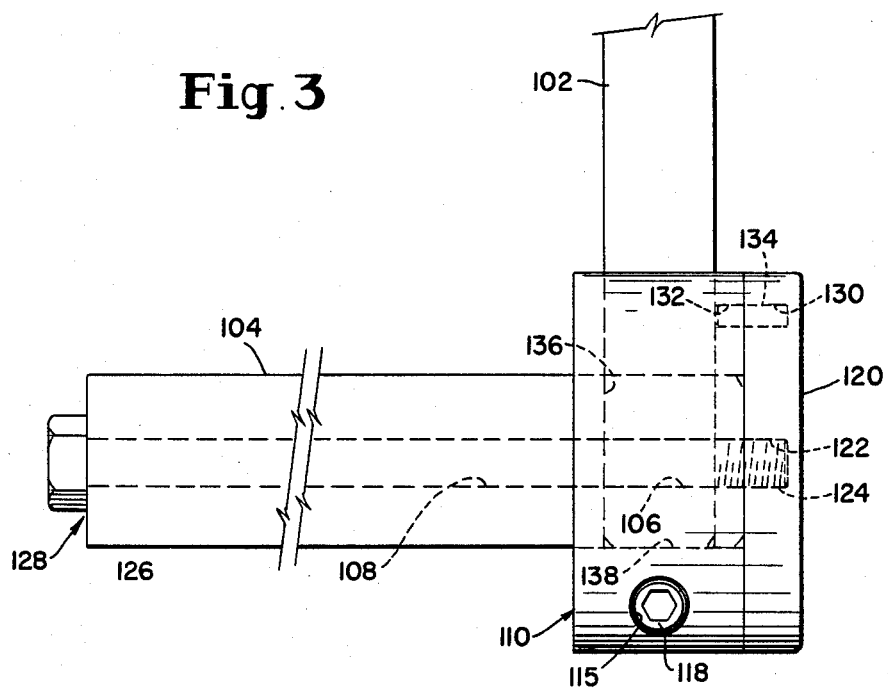
Figure 4:
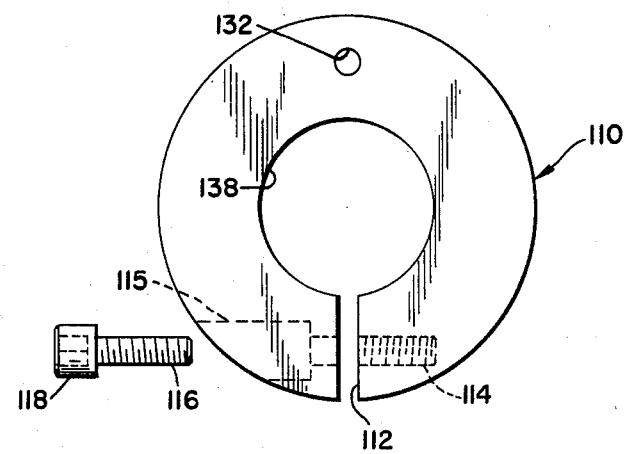

The invention is described in the following specification and shown in the drawings, in which:

FIG. 1 is an exploded view of the prior art joint;
FIG. 2 is an exploded view of the improved joint;
FIG. 3 is a view of the joint assembled; and,
FIG. 4 is an end view of the split collar illustrated in the operation of the clamping bolt.

In the drawings, the prior art joint of FIG. 1 is described with low-numbered reference numerals and the elements of the improved joint which most nearly correspond to the elements in the prior art joint are designated with reference numerals having hundreds prefixes. Referring first to FIG. 1, the arm 2 is to be joined to the shaft 4. Near the end of arm 2 is a transverse threaded bore 6, and the shaft 4 has a longitudinal bore 8 which intercepts transverse bore 36 near the end of the shaft. When the parts are assembled a hub 10 is fitted over the end of the shaft. The hub has a socket 38 which accepts the end of the shaft and a transverse passage 35 through which the end of arm 2 engages. The arm 2 is inserted through transverse passage 35 in hub 10 until its threaded bolt hole 6 registers with the longitudinal bore 8 of the shaft, whereupon the threads 24 on the shank 26 of assembly bolt 28 are engaged in the threaded bolt hole 6 of the arm. The hub 10 does not reinforce the joint. Frequent and oftimes forceful pulling down of the arm 2 causes it to rock in the transverse bore 36 and sooner or later it is likely to shear off at the threaded bolt hole 6.

Referring first to FIG. 2 which is an exploded view of the improvement, it will be seen that the threads in the threaded bolt hole 6 in handle 2 have been drilled out so that the hole 106 through handle 102 is of smooth bore. The shaft 104 with its axial bore 108 and transverse bore 136 remain the same except in that the assembly bolt 128 is somewhat longer than in the prior art joint. Instead of hub 10 of the prior art assembly, this invention is comprised of a collar 110 which is split as is 112 (FIG. 4) and provided with a threaded bolt hole 114 on one side of the split and on the other side of the split a countersink 115 to accommodate clamping bolt 118. The collar 110 has an axial bore 138 which accommodates the end of shaft 104, the axial bore 138 being intersected by a radial bore 135 through which engages the end of arm 102.

On the end of collar 110 is an end cap 120 which has on its inner side a threaded socket 122 which accommodates the threaded end 124 of assembly bolt 128. On the inner side of end cap 120 is a dowel pin hole 130 which registers with a dowel pin hole 132 on the outer side of collar 110 so that when the dowel pin 134 is engaged in the dowel pin holes, end cap 120 is prevented from rotating with respect to collar 110.

In assembly, collar 110 is engaged over the end of shaft 104, arm 102 is inserted through the radial bore 135 and collar 110 until its transverse bore 106 registers with the longitudinal bore 108 in the rack shaft. End cap 120 is engaged onto the end of collar 110 with the dowel pin in place, assembly bolt 128 is inserted through the longitudinal bore 108 of the shaft 104 until the threads 124 on the end of the assembly bolt engage into the threaded socket 122 in the end cap and the assembly bolt is tightened so as to draw the side of the radial bore 135 in the collar tightly against the side of arm 102, whereupon clamping bolt 118 is tightened so as to clamp the collar tightly in place, with the parts then being as seen in FIG. 3. In this condition a side pressure is exerted on the arm to keep from rocking in the transverse passage 136 through the shaft 104. The engagement of the collar 110 tightly against the arm 102 not only makes the arm tight in its hole, but it also lends additional support to the arm above the work point, i.e., the bolt hole, and it also prevents wear around the bolt hole or wear of the arm against the transverse passage 136 through the shaft.

I claim:

1. In a joint for connecting an arm to a shaft wherein the shaft has a longitudinal bore and a transverse passage therethrough intersecting the longitudinal bore and an end portion of the arm engaging in the transverse passage in the shaft and a hole therethrough registering with the longitudinal bore of the shaft and an assembly bolt disposed in the longitudinal bore of the shaft and extending through the hole in the arm, the improvement which comprises:

a split collar having an axial bore therethrough engaging over the shaft and a radial bore registering with the transverse passage through the shaft and accommodating the arm, means for drawing the collar tightly against the arm, and means for clamping the collar around the shaft.

2. A joint as claimed in claim 1, said shaft having an end terminating adjacent an end of the collar, the means for drawing the collar tightly against the arm comprising an end cap having an inner side engaging against said end of said split collar and having an internally threaded socket registering with the longitudinal bore of the shaft, and an assembly bolt disposed in the longitudinal bore of the shaft and an externally threaded end threadedly engaging in the internally threaded socket in the end cap.

* * * * *